(12) United States Patent
Avanian

(10) Patent No.: US 8,857,850 B2
(45) Date of Patent: Oct. 14, 2014

(54) CUSHIONED BARRIER FOR PETS IN A VEHICLE

(71) Applicant: Harry Avanian, North Hollywood, CA (US)

(72) Inventor: Harry Avanian, North Hollywood, CA (US)

(*) Notice: Subject to any disclaimer, the term of this patent is extended or adjusted under 35 U.S.C. 154(b) by 0 days.

(21) Appl. No.: 13/785,223

(22) Filed: Mar. 5, 2013

(65) Prior Publication Data

US 2014/0252751 A1 Sep. 11, 2014

(51) Int. Cl.
*B60R 21/06* (2006.01)
*B60R 21/02* (2006.01)

(52) U.S. Cl.
CPC ............... *B60R 21/02* (2013.01); *B60R 21/06* (2013.01); *B60R 21/026* (2013.01)
USPC ...... 280/751; 296/24.31; 296/24.4; 296/24.46

(58) Field of Classification Search
CPC ....... B60P 3/04; B62D 33/042; B60R 21/062; B60R 21/04; B60R 21/06
USPC ........... 280/751, 753; 296/24.31, 24.4, 24.46; 119/771
See application file for complete search history.

(56) References Cited

U.S. PATENT DOCUMENTS

| | | | | |
|---|---|---|---|---|
| 3,696,449 | A * | 10/1972 | Smith | 5/94 |
| 5,185,896 | A * | 2/1993 | Bonda | 5/118 |
| 5,743,554 | A * | 4/1998 | Friedrich et al. | 280/730.1 |
| 5,971,487 | A * | 10/1999 | Passehl | 297/464 |
| 6,601,898 | B2 * | 8/2003 | Luik et al. | 296/37.16 |
| 6,913,303 | B2 * | 7/2005 | Kobiela et al. | 296/1.01 |
| 7,478,858 | B1 * | 1/2009 | Brun | 296/39.1 |
| 2002/0180229 | A1 * | 12/2002 | Wheat | 296/24.1 |
| 2010/0264682 | A1 * | 10/2010 | Heller | 296/24.46 |
| 2011/0042989 | A1 * | 2/2011 | Heller | 296/24.46 |

* cited by examiner

*Primary Examiner* — James English
(74) *Attorney, Agent, or Firm* — The Law Office of Jerry D. Haynes

(57) ABSTRACT

A cushioned barrier for a pet in a vehicle comprising a central body, where the central body includes a first vertical surface and a second vertical surface, and where the central body is covered in a textured cover; a first protrusion on the first vertical surface; and a second protrusion on the second vertical surface, where the first protrusion and the second protrusion wedge the cushioned barrier between a front seat and a seat cushion of a backseat. The first protrusion may be an angled support and the second protrusion may be a square support where each are attached with Velcro® to the central body to enable adjustments of the protrusions along the central body.

8 Claims, 2 Drawing Sheets

CUSHIONED BARRIER FOR PETS IN A VEHICLE

BACKGROUND OF THE INVENTION

1. Field of the Invention

The present invention relates to a cushioned barrier that allows a pet to ride in the backseat of a vehicle without falling onto the floor.

2. Description of Related Art

Pet owners often take their pets with them on car rides whether running errands, trips to the park or even to pet friendly restaurants for a bite to eat. The pet may travel in the front passenger seat or they may be restricted to a backseat or back cabin depending on the size of the animal, temperament, and animal's comfort level during travel. Often times, when the pet is freely standing on the front or back seat, they will stumble or fall as soon as the driver applies their brakes. This may injure the pet if they land wrong or hit their head or paws on an object in front of them.

To prevent pet injuries while traveling in a vehicle pet harnesses and carriers have been developed to secure the animal in place. Some pet owners may place their animals in carriers that completely enclose the animal in a mesh bag or crate to prevent them from moving around the cabin or stumbling when the brakes are applied. Alternatively, some people may strap their pets into a modified seat belt or harness which restricts movement of the animal to the seat to prevent injury while the vehicle is in motion. Finally, pet car seats have been developed which combine the features of a carrier with advantages of a harness to isolate the pet. The car seat may be a pet bed structure which straps into the normal seatbelt of the vehicle. While these pet restraints do help to keep the animals safe while riding in a vehicle, they restrict free movement. Movement restriction may cause the animal to become even more nervous and anxious especially when they are nervous to ride in the car in the first place.

Therefore, it would be desirable in the art to provide an alternative safety device for pets while riding in a vehicle. It would also be beneficial for the device to allow unrestricted movement of the pet while still keeping them safe during travel.

SUMMARY OF THE INVENTION

In view of the foregoing disadvantages inherent in the prior art, the general purpose of the present invention is to provide a barrier between the front seat and the backseat of a vehicle, configured to include all of the advantages of the prior art, and to overcome the drawbacks inherent therein.

Accordingly, an object of the present invention is to provide a barrier for a pet that wedges between a front seat and a back seat of a vehicle to provide a soft wall that prevents injury to the animal when riding in the backseat.

Another object of the present invention is to provide adjustable supports on the barrier that allows a user to position the barrier in any vehicle and further permits exchange from one vehicle to another.

To achieve the above objects, in an aspect of the present invention, a cushioned barrier for a pet in a vehicle is described comprising a central body, where the central body includes a first vertical surface and a second vertical surface, and where the central body is covered in a textured cover; a first protrusion on the first vertical surface; and a second protrusion on the second vertical surface, where the first protrusion and the second protrusion wedge the cushioned barrier between a front seat and a seat cushion of a backseat.

The first protrusion may be an angled support and the second protrusion may be a square support where each are attached with Velcro® to the central body to enable adjustments of the protrusions along the central body.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a barrier that allows a pet to ride in the backseat of a vehicle without falling onto the floor. The present invention provides a cushioned barrier that wedges between a front seat and back seat of a vehicle to keep the pet on the back seat cushion. The cushioned barrier is a large piece of foam material with adjustable supports to ensure that the cushioned barrier remains in place. The support may be attached and reattached to provide an optimal fit within a vehicle, and then to allow for exchange from one vehicle to another. With the cushioned barrier, the pet owner is assured that their pet remains safe in the backseat, without the confining and uncomfortable straps of standard pet vehicle restraints.

Figure 1:
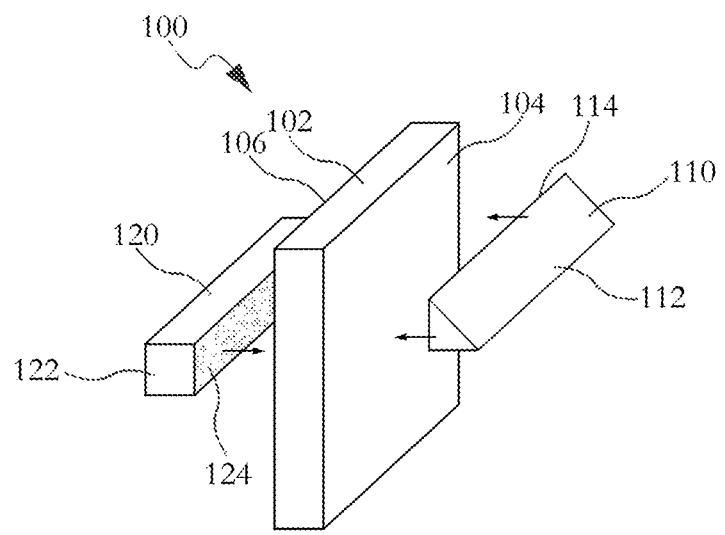
FIG. 1 depicts a perspective view of a cushioned barrier in accordance with an exemplary embodiment of the present invention.

Turning now descriptively to the drawings, referring to FIG. 1, a perspective view of a cushioned barrier 100 is shown in accordance with an exemplary embodiment of the present invention. The cushioned barrier 100 is comprised of a central body 102 embodying a generally rectangular shape. The central body 102 includes two exposed, vertical surfaces, a first surface 104 and a second opposing surface 106. The central body 102 may be a large piece of sponge or foam material. A cover may be placed over the sponge to ensure longevity of the material, and to allow for easy cleanup. The cover may be textured with a soft material to allow for attachment of Velcro® to the outer surface. The dimensions of the central body 102 may be 30 inches high, 24 inches wide and 6-8 inches deep.

The cushioned barrier 100 includes an angled support 110. The angled support 110 may comprise a triangular prism shape including an angled side 112 and a contact side 114. The angled support 110 attaches to the central body 102 when the contact side 114 comes into contact with the first surface 104. The contact side 114 includes a Velcro®, or hook and loop fastener, backing 114 for adjustable attachment of the angled support 110 against textured cover of the central body 102.

The cushioned barrier 100 further includes a square support 120. The square support 120 includes an outer side 122 and a contact side 124. The square support 120 attaches to the central body 102 when the contact side 124 attaches to the second surface 106. The contact side 124 is covered in Velcro® for an adjustable fit against the second surface 106. Both the angled support 110 and the square support 120 are made from a foam or sponge material for a flexible fit within a vehicle.

Figure 2:
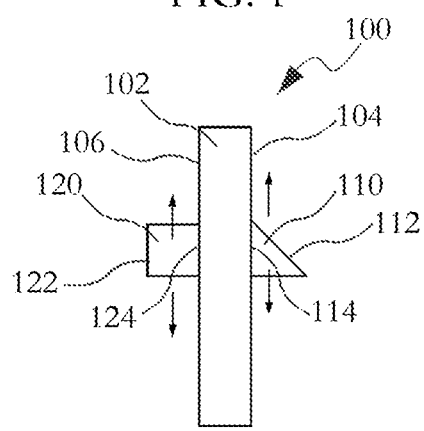
FIG. 2 depicts a side view of a cushioned barrier in accordance with an exemplary embodiment of the present invention.

Referring now to FIG. 2, a side view of the cushioned barrier 100 is shown in accordance with an exemplary embodiment of the present invention. The central body 102 is illustrated with the angled support 110 and the square support 120 attached evenly to the first surface 104 and the second surface 106 respectively. The angled support 110 and the square support 120 may be positioned up or down along the first surface 104 and the second surface 106 to provide the optimal fit within a vehicle.

Figure 3:
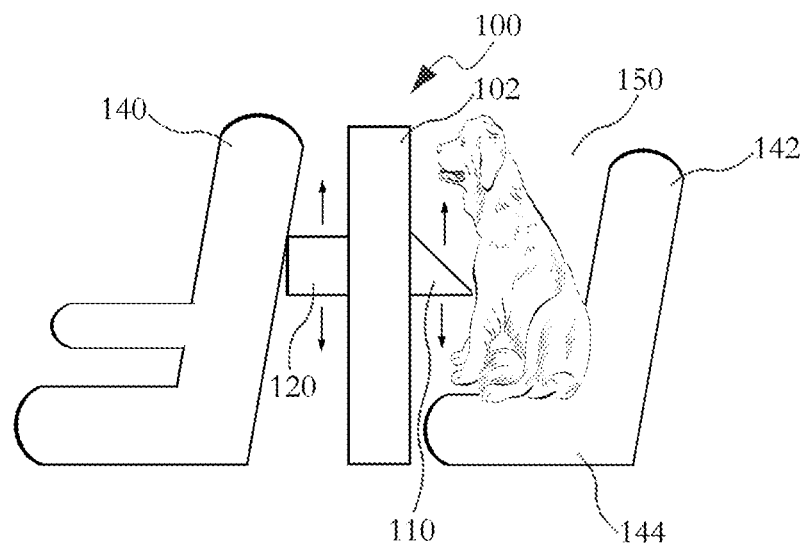
FIG. 3 depicts a side view of a cushioned barrier within a vehicle in accordance with an exemplary embodiment of the present invention.

Referring now to FIG. 3, a side view of the cushioned barrier 100 within a vehicle is shown in accordance with an exemplary embodiment of the present invention. The cushioned barrier 100 fits between a front seat 140 and a backseat 142 of the vehicle. The angled support 110 may be positioned to rest in front of the seat cushion 144. This way the dog 150 may rest their paws on the angled side of the angled support 110. Also, the cushioned barrier 100 prevents the dog 150 from falling onto the vehicle floor as the vehicle is in motion.

Figure 4:
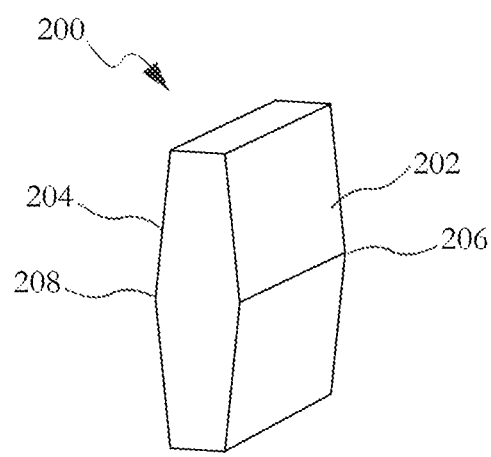
FIG. 4 depicts a perspective view of cushioned barrier in accordance with an alternative embodiment of the present invention.

Finally, FIG. 4 shows a perspective view of a cushioned barrier 200 in accordance with an alternative embodiment of the present invention. The cushioned barrier 200 includes a first surface 202 and a second surface 204. Around the mid-portion of the first surface 202 is a first protrusion 206 or peak. Likewise, around the mid-portion of the second surface 204 is a second protrusion 208 or peak. The protrusions 206, 208 wedge the cushioned barrier 200 between the front seat and the backseat of the vehicle.

By utilizing the cushioned barrier the pet is provided a soft wall between themselves and the front seat. This way the pet will not fall onto the ground between the seats when the driver applies the brakes keeping the pets safer and more comfortable by resting easily on the backseat cushion. The pet may easily rest their front paws or heads on the angled support for an even more pleasurable car riding experience.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A cushioned barrier for a pet in a vehicle comprising:
   a. a central body, where the central body includes a first vertical surface and a second vertical surface, and where the central body is covered in a textured cover;
   b. a first protrusion on the first vertical surface, where the first protrusion an angled support shaped as a triangular prism that extends toward a backseat cushion of the vehicle; and
   c. a second protrusion on the second vertical surface, where the second protrusion extends toward a front seat cushion, and where the angled support provides a surface upon which the pet on the backseat cushion rests.

2. The cushioned barrier for the pet in the vehicle according to claim 1, where the angled support includes an angled side and a contact side, where the contact side attaches to the first vertical surface and the angled side is a resting surface for the pet.

3. The cushioned barrier for the pet in the vehicle according to claim 2, where the contact side of the angled support includes hook and loop fasteners to adjustably attach the angled support to the textured cover of the central body.

4. The cushioned barrier for the pet in the vehicle according to claim 2, where the angled support is made from a foam material.

5. The cushioned barrier for the pet in the vehicle according to claim 1, where the second protrusion is a square support adjustably attached to the second vertical surface at a contact side.

6. The cushioned barrier for the pet in the vehicle according to claim 5, where the contact side of the square support includes hook and loop fasteners to adjustably attach the square support to the textured cover of the central body.

7. The cushioned barrier for the pet in the vehicle according to claim 5, where the square support is made from a foam material.

8. The cushioned barrier for the pet in the vehicle according to claim 1, where the central body is a large piece of foam material.

* * * * *